US009992466B2

(12) United States Patent
Pawlak et al.

(10) Patent No.: US 9,992,466 B2
(45) Date of Patent: Jun. 5, 2018

(54) PROJECTOR WITH CALIBRATION USING A PLURALITY OF IMAGES

(71) Applicant: SEIKO EPSON CORPORATION, Tokyo (JP)

(72) Inventors: Karol Marcin Pawlak, Trondheim (NO); Kenji Tanaka, Trondheim (NO); Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 14/598,820

(22) Filed: Jan. 16, 2015

(65) Prior Publication Data

US 2015/0208050 A1    Jul. 23, 2015

(30) Foreign Application Priority Data

Jan. 21, 2014  (JP) ................................ 2014-008635
Mar. 25, 2014 (JP) ................................ 2014-062266

(51) Int. Cl.
*H04N 9/31* (2006.01)
*H04N 17/00* (2006.01)

(52) U.S. Cl.
CPC ......... *H04N 9/3194* (2013.01); *H04N 9/3179* (2013.01); *H04N 9/3182* (2013.01); *H04N 9/3185* (2013.01); *H04N 9/3188* (2013.01); *H04N 17/004* (2013.01)

(58) Field of Classification Search
CPC .. H04N 9/3185; H04N 9/3194; H04N 9/3179; H04N 9/3182; H04N 9/3188
See application file for complete search history.

(56) References Cited

U.S. PATENT DOCUMENTS

| 8,109,639 | B2* | 2/2012 | Furui | H04N 9/3185 353/69 |
| 8,126,286 | B2* | 2/2012 | Imai | G06T 5/006 348/744 |
| 8,445,830 | B2* | 5/2013 | Furui | H04N 9/31 250/208.1 |
| 8,933,880 | B2* | 1/2015 | Takamatsu | G06F 3/005 345/157 |
| 2009/0207185 | A1* | 8/2009 | Furui | H04N 9/3185 345/619 |
| 2009/0245682 | A1* | 10/2009 | Imai | G06T 5/006 382/275 |

(Continued)

FOREIGN PATENT DOCUMENTS

JP  2011-227600 A  11/2011
JP  2012-118289 A  6/2012

*Primary Examiner* — Bao-Luan Le
(74) *Attorney, Agent, or Firm* — Oliff PLC

(57) ABSTRACT

A position detection portion of a projector detects an operation on a screen based on a captured image obtained by capturing the screen. A control portion executes a calibration in which positions in a projection image and positions in the captured image are associated with each other based on the captured image obtained by capturing the projection image projected by a calibration control portion based on auto calibration images in which marks for specifying positions are arranged. In addition, the calibration control portion executes the calibration based on the captured image corresponding to the plurality of auto calibration images which are different in arrangement states of the marks.

8 Claims, 8 Drawing Sheets

(56) References Cited

U.S. PATENT DOCUMENTS

| | | | |
|---|---|---|---|
| 2011/0210987 A1* | 9/2011 | Furui | H04N 9/31 |
| | | | 345/682 |
| 2012/0140189 A1 | 6/2012 | Hiranuma et al. | |
| 2012/0182216 A1* | 7/2012 | Takamatsu | G06F 3/005 |
| | | | 345/157 |

* cited by examiner

PROJECTOR WITH CALIBRATION USING A PLURALITY OF IMAGES

The entire disclosure of Japanese Patent Application Nos. 2014-008635, filed Jan. 21, 2014 and 2014-062266, filed Mar. 25, 2014 are expressly incorporated by reference herein.

BACKGROUND

1. Technical Field

The present invention relates to a projector, a display apparatus, and a control method of the projector.

2. Related Art

In the related art, a calibration performed in an apparatus that detects an operation position when an input operation is performed has been known (for example, see JP-A-2011-227600). For example, in a system disclosed in JP-A-2011-227600, a projection image of a projector is captured, and the calibration in which positions in the projection image and a captured image based on the captured image are associated is executed.

As the same manner as JP-A-2011-227600, in an auto calibration according to the related art, an image including a pattern such as a checkered pattern is projected, the pattern from a captured image is detected, and detected positions are associated. Accordingly, as the pattern is finer, multiple coordinates can be associated, and the accuracy of position detection can be increased. However, it is difficult to detect the patterns from the captured image as the pattern is finer, and the computational load of the process for detecting the pattern becomes heavy.

SUMMARY

An advantage of some aspects of the invention is to effectively and highly precisely associate positions in a projection image and positions in a captured image by a calibration.

In aspect of the invention is directed to a projector including: a projecting portion that projects an image on a projection surface; a detection portion that detects an operation on the projection surface based on a captured image obtained by capturing an image of the projection surface; and a calibration control portion that executes a calibration in which positions in a projection image and positions in the captured image are associated with each other based on the captured image obtained by capturing the projection image projected by the projecting portion based on images for calibration in which symbols for specifying positions are arranged, in which the calibration control portion executes the calibration based on the captured image corresponding to the plurality of images for calibration which are different in arrangement states of the symbols.

With this configuration, since the calibration is performed by using a plurality of images for calibration which are different in the arrangement states of symbols, even if the symbols in the images for calibration are not fine, the positions in the captured imago and the positions in the projection image can be associated at multiple positions. Therefore, it is possible to highly accurately associate positions. In addition, since the symbols in the images for calibration do not have to be fine, the symbols can be correctly and easily detected. Accordingly, the calibration can be effectively and highly accurately performed.

Another aspect of the invention is directed to the projector described above, wherein the calibration control portion generates calibration data in which positions in the projection image and positions in the captured image are associated with each other.

With this configuration, since the calibration data in which positions in the projection image and positions in the captured image are finely associated with each other are generated, it is possible to detect positions highly accurately by using the calibration data.

Still another aspect of the invention is directed to the projector described above, wherein the calibration control portion generates one of the calibration data based on the captured image corresponding to the plurality of images for calibration.

With this configuration, the calibration data in which positions in the projection Image and positions in the captured image are more finely associated with each other can be generated compared with the case in which one of the images for calibration is used.

Yet another aspect of the invention is directed to the projector described above, wherein the calibration control portion generates the calibration data by respectively associating the symbols arranged in the plurality of images for calibration with different coordinates.

With this configuration, it is possible to associate a greater number of coordinates than the number of symbols in one calibration image by using a plurality of calibration images. Accordingly, it is possible to associate positions in multiple coordinates with respect to the calibration data, so it is possible to generate highly precise calibration data without being restricted by the number of symbols in the image for calibration.

Still yet another aspect of the invention is directed to the projector described above, wherein the calibration control portion generates the calibration data based on the captured image which is binary or grayscale.

With this configuration, since the data amount of the captured image can be suppressed and the computational load of the process for detecting the symbols from the captured image is light, the calibration can be effectively executed. In addition, even if the number of symbols in the calibration image decreases so that symbols can be easily detected in the binary or grayscale captured image, the highly precise calibration data can be generated.

Further another aspect of the invention is directed to the projector described above, wherein the calibration control portion generates the calibration data based on the captured image captured with visible light.

With this configuration, an image with visible light based on the image for calibration is projected, and the calibration is performed based on the captured image obtained by capturing the projection image with visible light. Therefore, the state of the automatically executed calibration can be recognized by the user.

Still further another aspect of the invention is directed to the projector described above, wherein the images for calibration are images in which the symbols configured with at least a plurality of pixels are arranged.

With this configuration, since the symbols arranged in the image for calibration are configured with a plurality of pixels and have dimensions, the symbols can be easily detected from the captured image. In addition, more information can be obtained in the process in which the captured image and the projection image are associated from the deformation of the shapes of the symbols, or the like. Additionally, for example, the calibration can be highly accurately performed by extracting the images of the symbols from the captured image and setting the centroids of the symbols to be detection coordinates.

Yet further another aspect of the invention is directed to a display apparatus including: a display portion that displays an image on a display surface; a detection portion that detects an operation on the display surface based on a captured image obtained by capturing an image of the display surface; and a calibration control portion that executes a calibration in which positions in a display image and positions in the captured image are associated with each other based on the captured image obtained by capturing the display image displayed by the display portion based on images for calibration in which symbols for specifying positions are arranged, in which the calibration control portion executes the calibration based on the captured image corresponding to the plurality of images for calibration which are different in arrangement states of the symbols.

With this configuration, since the calibration is performed by using a plurality of images for calibration which are different in an arrangement state of symbols, even if the symbols in the images for calibration are not fine, the positions in the captured image and the positions in the projection image can be associated at multiple positions. Therefore, it is possible to highly accurately associate positions. In addition, since the symbols in the images for calibration do not have to be fine, the symbols can be correctly and easily detected. Accordingly, the calibration can be effectively and highly accurately performed.

Still yet further another aspect of the invention is directed to a control method of a projector including a projecting portion that projects an image on a projection surface, including detecting an operation on the projection surface based on a captured image obtained by capturing an image of the projection surface; executing a calibration in which positions in a projection image and positions in the captured image are associated with each other based on the captured image obtained by capturing the projection image projected by the projecting portion based on images for calibration in which symbols for specifying positions are arranged, in which the calibration is executed based on the captured image corresponding to the plurality of images for calibration which are different in arrangement states of the symbols.

With this configuration, since the calibration is performed by using a plurality of images for calibration which are different in the arrangement states of symbols, even if the symbols in the images for calibration are not fine, the positions in the captured image and the positions in the projection image can be associated at multiple positions. Therefore, it is possible to highly accurately associate positions. In addition, since the symbols in the images for calibration do not have to be fine, the symbols can be correctly and easily detected. Accordingly, the calibration can be effectively and highly accurately performed.

According to the aspects of the invention, the calibration can be effectively and highly accurately performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention are described with reference to the accompanying drawings.

Figure 1:
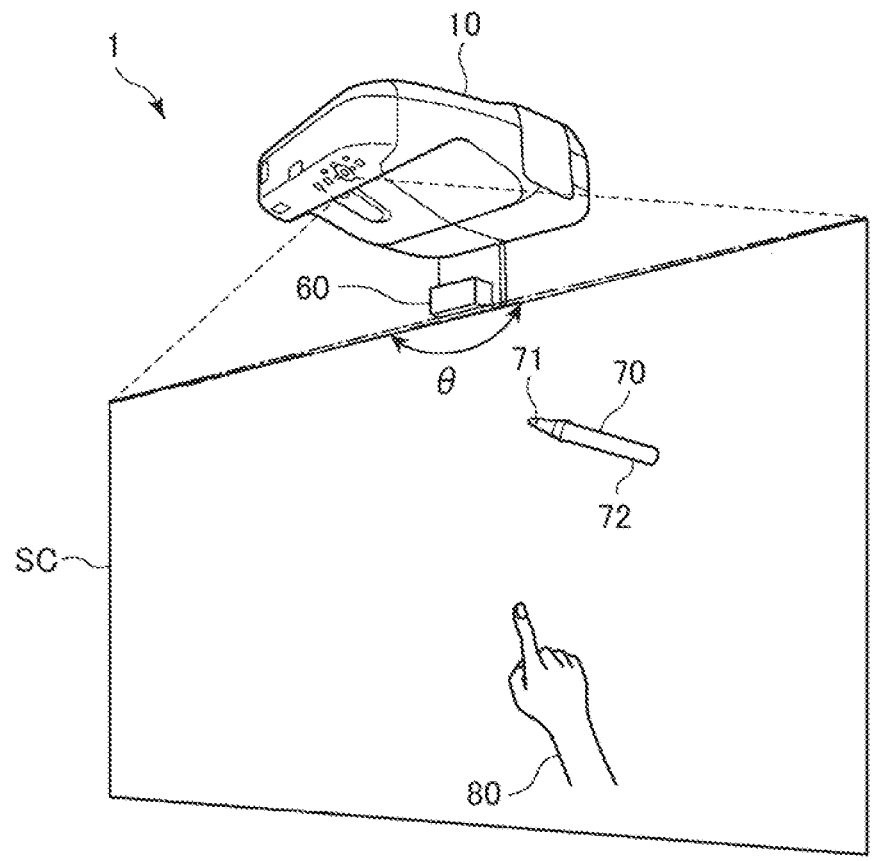
FIG. 1 is a diagram schematically illustrating a configuration of a projection system according to an embodiment.

FIG. 1 is a diagram illustrating a configuration of a projection system 1 according to the embodiment to which the invention is applied. The projection system 1 includes a projector 10 installed, on the upper side of a screen SC (projection surface, operation surface, display surface) and a light emitting apparatus (light emitting portion) 60 installed on the upper side of the screen SC.

The projector 10 is a display apparatus which is installed right above or on the obliquely upper side of the screen SC, and projects an image toward the screen SC on the obliquely lower side. In addition, the screen SC described in the present embodiment is a flat board or a screen fixed on a surface of a wall or stood on a floor. The invention is not limited to this example, and a surface of a wall can be used as the screen SC. In this case, the projector 10 and the light emitting apparatus 60 may be mounted on the upper portion of the surface of the wall used as the screen SC.

The projector 10 is connected to an external image supplying apparatus such as a personal computer (PC), a video reproducing apparatus, or a DVD reproducing apparatus, and projects an image on the screen SC based on the analog image signal or the data of the digital image supplied from the image supplying apparatus. In addition, the projector 10 may read image data stored in the embedded storage portion 110 (FIG. 2) or externally connected recording medium, and display an image on the screen SC based on the image data.

The light emitting apparatus 60 has a light source portion 61 (FIG. 2) formed of a solid light source and diffuses and emits (applies) light generated by the light source portion 61 along the screen SC. The emission scope of the light emitting apparatus 60 is illustrated by an angle θ in FIG. 1. The light emitting apparatus 60 is installed above from the upper end of the screen SC and downwardly emits the light in the scope of the angle θ, and the light forms a light layer along the screen SC. The angle θ according to the present embodiment reaches almost 180°, and the light layer is formed on nearly the entire screen SC. It is preferable that the front, surface of the screen SC and the light layer are close to each other, and the distance between the front surface of the screen SC and the light layer according to the present embodiment is roughly in the scope of 1 mm to 10 mm.

The light emitted by the light emitting apparatus 60 is light outside the visible spectrum, and is infrared light in the present embodiment.

When the indication, operation is performed on the screen SC, the projection system 1 detects the indication position by the projector 10.

The indicator used in the indication operation can use a pen-type indicator 70. Since an operating switch 75 (FIG. 2) that operates when being pressed is embedded on a tip portion 71 of the indicator 70, if an operation of pressing the tip portion 71 on the wall or the screen SC is performed, the operating switch 75 is turned on. A user holds a bar-shaped shaft portion 72 in his or her hand and operates the indicator 70 so that the tip portion 71 is in contact with the screen SC or the tip portion 71 is pressed onto the screen SC. A transmitting and receiving portion 74 (FIG. 2) that emits light is provided on the tip portion 71. The projector 10 detects a position of the tip portion 71 as an indication position based on the infrared light generated by the indicator 70. The light emitted by the indicator 70 is light outside the visible spectrum, and is infrared light in the present embodiment.

In addition, when the position indication operation is performed by an indicator 80 which is a finger of the user, the user causes the finger to come into contact with the screen SC. In this case, a position on which the indicator 80 comes into contact with the screen SC is detected.

That is, when the tip of the indicator 80 (for example, a fingertip) is in contact with the screen SC, the light layer formed by the light emitting apparatus 60 is blocked. At this point, the light emitted by the light emitting apparatus 60 is reflected on the indicator 80, and a portion of the reflected light travels from the indicator 80 to the projector 10. Since the projector 10 has a function of detecting the light from the screen SC side, that is, the light from the lower side, with a position detection portion 50 described below, the reflected light of the indicator 80 can be detected. The projector 10 detects an indication operation to the screen SC by the indicator 80, by detecting the reflected light reflected on the indicator 80. In addition, the projector 10 detects the indication position indicated by the indicator 80.

Since the light layer emitted by the light emitting apparatus 60 is close to the screen SC, the position of the indicator 80 at which light is reflected can be considered to be the tip or the indication position which is closest to the screen SC. Therefore, the indication position can be specified based on the reflected light of the indicator 80.

The projection system 1 functions as an interactive white board system, detects an indication operation performed by the user with the indicators 70 and 80, and causes the indication position to be reflected on the projection image.

Specifically, the projection system 1 performs a process of drawing a diagram or arranging a character or a symbol on the indication position, a process of drawing a diagram, along a locus of the indication position, a process of deleting the drawn diagram or the arranged character or symbol, or the like. In addition, the drawn diagram or the arranged character or symbol en the screen SC can be stored as image data, and can be output to an external apparatus.

Additionally, the projection system 1 may be operated as a pointing device by detecting the indication position, and may output coordinates of the indication position on the image projection area at which the projector 10 projects an image on the screen SC. In addition, a Graphical User Interface (GUI) operation may be performed by using the coordinates.

Figure 2:
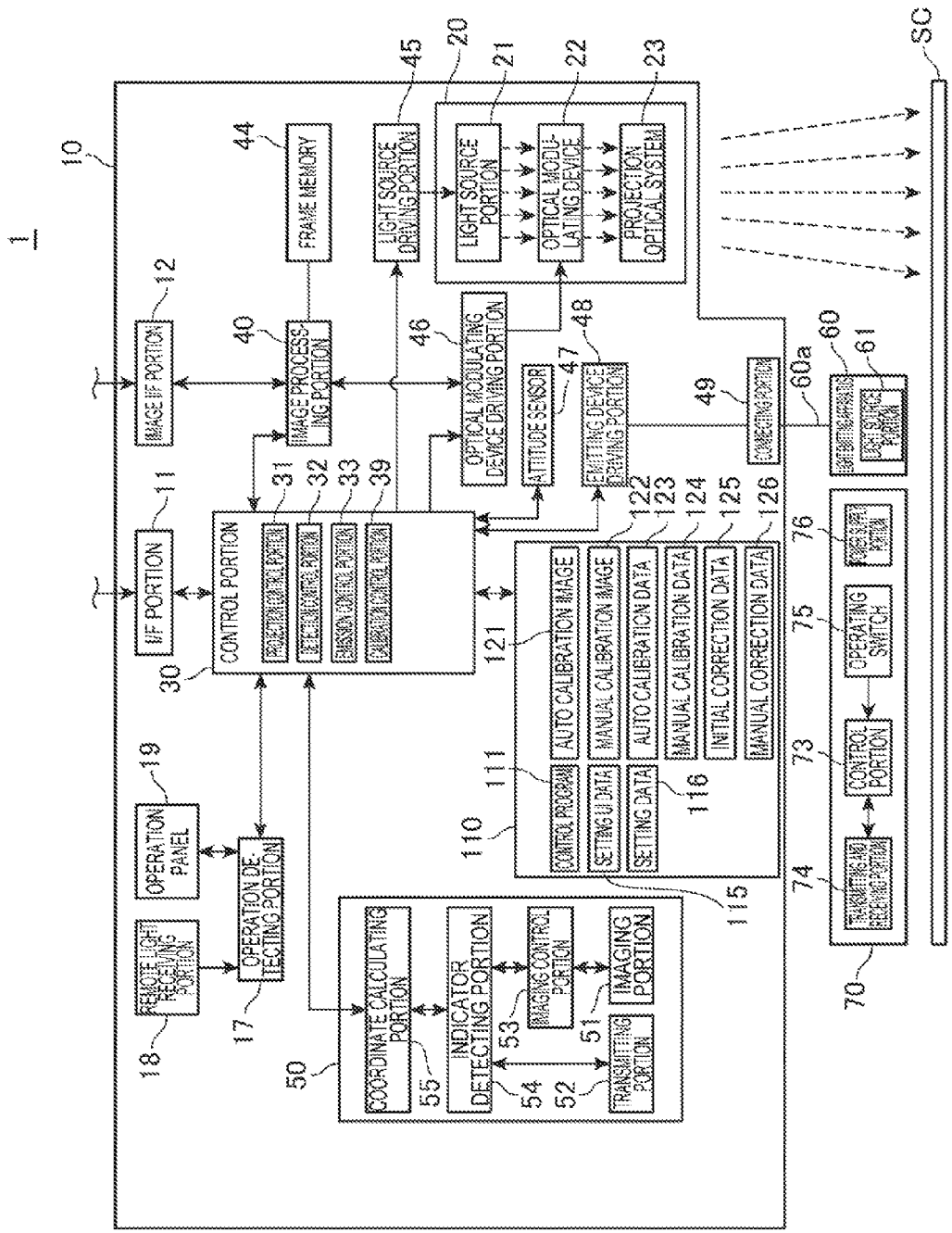
FIG. 2 is a functional block diagram of the projection system.

FIG. 2 is a functional block diagram of respective portions that form the projection system 1.

The projector 10 includes an interface (I/F) portion 11 and an image interface (I/F) portion 12 as interfaces for connection to an external apparatus. The I/F portion 11 and the image I/F portion 12 include connectors for wired connection, and may include interface circuits corresponding to the connectors. In addition, the I/F portion 11 and the image I/F portion 12 may include wireless communication interfaces. As the connectors and interface circuits for the wired connection, a connector or an interface circuit for the wired connection conforming to a wired LAN, IEEE1394, USB, or the like may be included. In addition, as an wireless communication interface, a connector or an interface circuit conforming to a wireless LAN, Bluetooth (registered trademark), or the like may be included. In the image I/F portion 12, an interface for image data such as HDMI (registered trademark) interface can be used. The image I/F portion 12 may include an interface for inputting sound data.

The I/F portion 11 is an interface for transmitting and receiving various data between external apparatuses such as a PC. The I/F portion 11 inputs and outputs control data relating to image projection, setting data for setting an operation of the projector 10, coordinate data of the indication position detected by the projector 10, or the like. The control portion 30 described below has a function of transmitting and receiving data with an external apparatus through the I/F portion 11.

The image I/F portion 12 is an interface for inputting digital image data. The projector 10 according to the present embodiment projects an image based on the digital image data input through the image I/F portion 12. Further, the projector 10 may include a function of projecting an image based on the analog image signal, and in this case, the image I/F portion 12 may include an interface for an analog image and an A/D converting circuit for converting an analog image signal into digital image data.

The projector 10 includes a projecting portion 20 (display portion) for forming an optical image. The projecting portion 20 includes a light source portion 21, an optical modulating device 22, and a projection optical system 23. The light source portion 21 includes a light source formed by a xenon lamp, an extra-high pressure mercury lamp, a Light Emitting Diode (LED), a laser light source, or the like. In addition, the light source portion 21 may include a reflector and an auxiliary reflector for guiding light generated by the light source to the optical modulating device 22. Additionally, a lens group (not illustrated) or a polarizing plate for enhancing an optical property of projected light, or a dimmer element for decreasing a light amount of the light generated from the light source on a path reaching the optical modulating device 22 may be included.

The optical modulating device 22 includes three transparent liquid crystal panels, for example, corresponding to three primary colors of RGB, and generates image light by modulating the light that penetrates through the liquid crystal panel. The light from the light source portion 21 is separated into colored beams of three colors of RGB, and the colored beams are incident to the respective corresponding liquid crystal panels. The colored beams that penetrate the respective liquid crystal panels and are modulated are synthesized by a synthesis optical system of a cross dichroic prism, and are emitted to the projection optical system 23.

The projection optical system 23 includes a lens group that guides image light modulated by the optical modulating device 22 in a direction of the screen SC, and forms an image on the screen SC. In addition, the projection optical system 23 may include a zoom mechanism that zooms in and out of a projection image of the screen SC, and adjusts a focal point, and a focus adjusting mechanism that adjusts a focus. When the projector 10 is a short focus type, a concave mirror that reflects image light toward the screen SC may be included in the projection optical system 23.

A light source driving portion 45 that turns on the light source portion 21 under the control of a control portion 30 and an optical modulating device driving portion 46 that operates the optical modulating device 22 under the control of the control portion 30 may be connected to the projecting portion 20. The light source driving portion 45 may have a function of switching the turning on and off of the light source portion 21, and adjusting a light amount of the light source portion 21.

The projector 10 includes an image processing system that processes an image projected by the projecting portion 20. The image processing system includes the control portion 30 that controls the projector 10, a storage portion 110, an operation detecting portion 17, an image processing portion 40, the light source driving portion 45, and the optical modulating device driving portion 46. In addition, a frame memory 44 is connected to the image processing portion 40, and the attitude sensor 47, the emitting device driving portion 48, and the position detection portion 50 are connected to the control portion 30. These items may be included in the image processing system.

The control portion 30 controls respective portions of the projector 10 by executing a predetermined control program 111. The storage portion 110 stores the control program 111 executed by the control portion 30 and data, processed by the control portion 30 in a non-volatile manner. The storage portion 110 stores setting screen data 112 of a screen for setting an operation of the projector 10, and setting data 113 for indicating contents set by using the setting screen data 112.

The image processing portion 40 processes image data input through the image I/F portion 12 and outputs image signals to the optical modulating device driving portion 46 under the control of the control portion 30. The processes performed by the image processing portion 40 are a process of determining a three-dimensional (3D) image and a plane (2D) image, a resolution converting process, a frame rate converting process, a distortion correction process, a digital zoom process, a color tone correction process, a brightness correction process, and the like. The image processing portion 40 executes a process designated by the control portion 30, and performs a process by using a parameter input from the control portion 30, if necessary. In addition, in is also possible to combine and execute a plurality of processes among the processes described above.

The image processing portion 40 is connected to the frame memory 44. The image processing portion 40 develops image data input from an image input I/F 12 on the frame memory 44, and executes the various processes with respect to the developed image data. The image processing portion 40 reads processed image data from the frame memory 44, generates image signals of RGB corresponding to the image data, and outputs the generated image signals to the optical modulating device driving portion 46.

The optical modulating device driving portion 46 is connected to the liquid crystal panel of the optical modulating device 22. The optical modulating device driving portion 46 drives the liquid crystal panel based on the image signals input from the image processing portion 40, and draws the image on the respective liquid crystal panels.

The operation detecting portion 17 is connected to a remote light receiving portion 18 and an operation panel 19 which function as input devices, and detects operations through the remote light receiving portion 18 and the operation panel 19.

The remote light receiving portion 18 receives an infrared signal transmitted according to a button operation by a remote controller (not illustrated) used by the user of the projector 10 by the remote light receiving portion 18. The remote light receiving portion 18 decodes the infrared signal received from the remote controller, generates operation data indicating operation contents according to the remote controller, and outputs the operation data to the control portion 30.

The operation panel 19 is provided on the exterior housing of the projector 10, and has various kinds of switches and indicator lamps. The operation detecting portion 17 appropriately turns on and off the indicator lamp of the operation panel 19 according to the operation state and the setting state of the projector 10 according to the control of the control portion 30. If the switch of the operation panel 19 is operated, the operation data according to the operated switch is output from the operation detecting portion 17 to the control portion 30.

An emitting device driving portion 48 is connected to the light emitting apparatus 60 through a connecting portion 49. The connecting portion 49 is, for example, a connector having a plurality of pins, and the light emitting apparatus 60 is connected to the connecting portion 49 through a cable 60a. The emitting device driving portion 48 generates a pulse signal according to the control of the control portion 30, and outputs the pulse signal to the light emitting apparatus 60 through the connecting portion 49. In addition, the emitting device driving portion 48 supplies electric power to the light emitting apparatus 60 through the connecting portion 49.

The light emitting apparatus 60 accommodates the light source portion 61 and optical components in a substantially box-shaped case as illustrated in FIG. 1. The light emitting apparatus 60 according to the present embodiment includes a solid light source 62 that generates infrared light to the light source portion 61. The infrared light generated by the solid light source 62 is diffused by a collimating lens and a Powell lens, and forms a surface along the screen SC. In addition, the light source portion 61 includes a plurality of solid light sources and may form a light layer so that the image projection scope of the screen SC is covered, by respectively diffusing light generated by the plurality of solid light sources. In addition, the light emitting apparatus 60 may include an adjustment mechanism that adjusts a distance and an angle between the light layer generated by the light source portion 61 and the screen SC. The light emitting apparatus 60 turns on the light source portion 61 by a pulse signal and electric power supplied from the emitting device driving portion 48. The timing at which the light source portion 61 is turned on and off is controlled by the emitting device driving portion 48. The control portion 30 controls the emitting device driving portion 48, and turns on the light source portion 61 in synchronization with the timing at which an imaging portion 51 described below performs capturing.

The position detection portion 50 (detection portion) detects the operation to the screen SC by the indicators 70 and 80. The position detection portion 50 includes the imaging portion 51, a transmitting portion 52, an imaging control portion 53, an indicator detecting portion 54, and a coordinate calculating portion 55.

The imaging portion 51 has an imaging optical system, an imaging element, an interface circuit, and the like, and captures the projection direction of the projection optical system 23. The imaging optical system of the imaging portion 51 is arranged toward substantially the same direction of the projection optical system 23, and has an angle of view that covers the scope in which the projection optical system 23 projects an image on the screen SC. In addition, the imaging element includes a CCD or a CMOS that receives light in an infrared region and a visible light region. The imaging portion 51 may include a filter for blocking a portion of light incident to the imaging element, and, for example, may arrange a filter for mainly transmitting light in the infrared region when the infrared light is received, before the imaging element. In addition, the interface circuit of the imaging portion 51 reads and outputs a detection value of the imaging element.

The imaging control portion 53 performs capturing by the imaging portion 51 and generates the data of the captured image. If the imaging element captures visible light, the image projected on the screen SC is captured. For example, the auto calibration image described below captures visible light. In addition, when the imaging control portion 53 captures infrared image by the imaging portion 51, the infrared light (infrared signal) generated by the indicator 70 and the reflected light reflected by the indicator 80 are taken in the captured image at this point.

The indicator detecting portion 54 detects the indication positions of the indicators 70 and 80 based on the data of the captured image captured by the imaging control portion 53. The indicator detecting portion 54 detects an image of the infrared light, generated by the indicator 70 and/or an image of the reflected light reflected on the indicator 80, from the data of the captured image when the imaging control portion 53 captures the infrared light by the imaging portion 51. Additionally, the indicator detecting portion 54 may determine whether the detected image is an image of the light generated by the indicator 70 or an image of the reflected light of the indicator 80.

The coordinate calculating portion 55 calculates the coordinates of the indication positions of the indicators 70 and 80 according to the data of the captured image based on the position detected by the indicator detecting portion 54, and outputs the coordinates to the control portion 30. The coordinate calculating portion 55 may calculate the coordinates of the indication positions of the indicators 70 and 80 with respect to the projection image projected by the projecting portion 20 and output the coordinates to the control portion 30. Additionally, the coordinate calculating portion 55 may calculate the coordinates of the indication positions of the indicators 70 and 80 with respect to the image data which is drawn by the image processing portion 40 in the frame memory 44 and the coordinates of the indication positions of the indicators 70 and 80 with respect to the input image data of the image I/F portion 12.

The transmitting portion 52 transmits the infrared signal to the indicator 70 under the control of the indicator detecting portion 54. The transmitting portion 52 has a light source of an infrared LED or the like, and turns on and off the light source under the control of the indicator detecting portion 54.

In addition, the indicator 70 includes a control portion 73, the transmitting and receiving portion 74, the operating switch 75, and a power supply portion 76, and the elements are accommodated in the shaft portion 72 (FIG. 1). The control portion 73 is connected to the transmitting and receiving portion 74 and the operating switch 75, and detects the on/off state of the operating switch 75. The transmitting and receiving portion 74 includes a light source such as an infrared LED and a light receiving element that receives the infrared light, turns on and off the light source under the control of the control portion 73, and outputs a signal indicating the light reception state of the light receiving element to the control portion 73.

The power supply portion 76 has a battery or a secondary battery as power supply, and supplies electric power to the control portion 73, the transmitting and receiving portion 74, and the operating switch 75.

The indicator 70 may include a power supply switch that turns on and off the power supply from the power supply portion 76.

Here, a method for specifying the indicator 70 from the data of the captured image of the imaging portion 51 by the communication between the position detection portion 50 and the indicator 70 is described.

When the position indication operation is detected by the indicator 70, the control portion 30 transmits a signal for synchronization from the transmitting portion 52 by controlling the indicator detecting portion 54. That is, the indicator detecting portion 54 turns on the light source of the transmitting portion 52 in a predetermined cycle under the control of the control portion 30. The infrared light periodically generated by the transmitting portion 52 functions as a synchronization signal for synchronizing the position detection portion 50 and the indicator 70.

Meanwhile, after the supply of the electric power from the power supply portion 76 is started and a predetermined initialization operation is performed, the control portion 73 receives the infrared light generated by the transmitting portion 52 of the projector 10 by the transmitting and receiving portion 74. If the infrared light periodically generated by the transmitting portion 52 is received by the transmitting and receiving portion 74, the control portion 73 turns on (emits) the light source of the transmitting and receiving portion 74 in the preset lighting pattern in synchronization with the timing of the infrared light. The lighting pattern indicates data specific to the indicator 70, by associating the turning on and off of the light source with the ON/OFF of the data. The control portion 73 turns on and off the light source according to the set turning-on time and the set turning-off time of the pattern. The control portion 73 repeats the pattern while the electric power is supplied from the power supply portion 76.

That is, the position detection portion 50 periodically transmits the infrared signal for the synchronization to the indicator 70, and the indicator 70 transmits the preset infrared signal in synchronization with the infrared signal transmitted by the position detection portion 50.

The imaging control portion 53 of the position detection portion 50 controls the capturing timing by the imaging portion 51 in synchronization with the timing at which the indicator 70 turns on light. The capturing timing is determined based on the timing at which the indicator detecting portion 54 turns on the transmitting portion 52. The indicator detecting portion 54 specifies the pattern at which the indicator 70 is turned on according to whether the image of the light of the indicator 70 is reflected in the data of the captured image of the imaging portion 51.

The pattern for turning on the indicator 70 can be a pattern specific to each item of the indicators 70, or a pattern including a pattern common to a plurality of the indicators 70, and a pattern specific to each item of the indicators 70. In this case, when the images of the infrared light generated by the plurality of indicators 70 are included in the data of the captured image, the indicator detecting portion 54 can distinguish respective images as images of the different indicators 70.

In addition, the control portion 30 synchronizes the timing of turning on the tight source portion 61 with the timing of capturing the imaging portion 51 by control ling the emitting device driving portion 48. If the light source portion 61 is turned on by pulses in synchronization with the capturing timing of the imaging portion 51, when the indicator 80 points on the screen SC, the reflected light of the indicator 80 is reflected on the captured image of the imaging portion 51. If the light source portion 61 is turned on at a pattern that is distinctive to the timing of turning on the indicator 70, the indicator detecting portion 54 can determine whether the image reflected on the data of the captured image is the indicator 70 or the indicator 80. The lighting timing of the light source portion 61 is described below with reference to FIGS. 8A and 8B.

Additionally, the control portion 73 included in the indicator 70 may switch the pattern for turning on the transmitting and receiving portion 74 according to the operation state of the operating switch 75. Therefore, the indicator detecting portion 54 can determine the operation state of the indicator 70 based on the plurality of the data of captured image, that is, whether the tip portion 71 is pressed on the screen SC.

An attitude sensor 47 is formed by an acceleration sensor, a gyro sensor, or the like, and outputs a detection value to the control portion 30. The attitude sensor 47 is fixed to the main body of the projector 10 in a manner so as to be capable of identifying the installation direction of the projector 10.

The projector 10 can be used in an installation state of performing projection from a lower side of the screen SC, and in an installation state of using a horizontal surface such as the upper surface of a desk as the screen SC in addition to the suspension installation of being suspended from the surface of a wall or a ceiling as illustrated in FIG. 1. There may be an installation state of the projector 10 which is not suitable for the usage of the light emitting apparatus 60. For example, when the projection is performed on the screen SC from the lower side, the body of the user may block the emission light of the light emitting apparatus 60. Therefore, the installation is inappropriate. The attitude sensor 47 is installed on the main body of the projector 10 so as to identify the plurality of installation states assumed as the installation states of the projector 10. The attitude sensor 47 may be formed by using, for example, a dual axis gyro sensor, a single axis gyro sensor, or an acceleration sensor. The control portion 30 can automatically determine the installation state of the projector 10 based on the output value of the attitude sensor 47. When the control portion 30 is determined to be in an installation state which is inappropriate for the usage of the light emitting apparatus 60, for example, the emitting device driving portion 48 stops an output of the power supply voltage or the pulse signal.

The control portion 30 realizes functions of a projection control portion 31, a detection control portion 32, an emission control portion 33, and a calibration control portion 39 by reading and executes the control program 111 recorded in the storage portion 110, and controls respective elements of the projector 10.

The projection control portion 31 acquires the operation contents performed by the user based on the operation data input from the operation detecting portion 17. The projection control portion 31 controls the image processing portion 40, the light source driving portion 45, and the optical modulating device driving portion 46 under the operation of the user, and causes the image to be projected on the screen SC. The projection control portion 31 controls the image processing portion 40, and executes the determination process of a three-dimensional (3D) image and a plane (2D) image as described above, a resolution converting process, a frame rate converting process, a distortion correction process, a digital zoom process, a color tone correction process, a brightness correction process, and the like. In addition, the projection control portion 31 controls the light source driving portion 45 in combination with the process of the image processing portion 40, and controls the light amount of the light source portion 21.

The detection control portion 32 controls the position detection portion 50, detects the operation positions of the indicators 70 and 80, and acquires the coordinates of the operation positions. In addition, the detection control portion 32 acquires data for identifying whether the detected operation position is an operation position of the indicator 70 or an operation position of the indicator 80, and data for indicating an operation state of the operating switch 75 together with the coordinates of the operation positions. The detection control portion 32 executes the preset process based on the acquired coordinates and data. For example, the detection control portion 32 executes a process of causing the image processing portion 40 to draw a diagram based on the acquired coordinates and superimposing and projecting the drawn diagram with an input image input by the image I/F portion 12. In addition, the detection control portion 32 may output the acquired coordinates to an external apparatus such as a PC connected to the I/F portion 11. In this case, the detection control portion 32 may convert the acquired coordinates into a data format identified as an input of a coordinate input device in an operating system of an external apparatus connected to the I/F portion 11 to output. For example, when a PC that operates in the Windows (registered trademark) operating system is connected to the I/F portion 11, data processed as input data of a Human Interface Device (HID) in the operating system is output. In addition, the detection control portion 32 may output data for determining whether an operation position is the operation position of the indicator 70 or the operation position of the indicator 80, and data for indicating the operation state of the operating switch 75 together with the coordinate data.

In addition, the detection control portion 32 controls the position detection using the indicator 80. Specifically, the detection control portion 32 determines whether the light emitting apparatus 60 can be used or not, based on the connection or the non-connection of the light emitting apparatus 60. When the light emitting apparatus 60 may not be used, the detection control portion 32 performs setting so that the light emitting apparatus 60 may not be used. Here, the detection control portion 32 may report that the light emitting apparatus 60 may not be used.

The emission control portion 33 executes or stops the output of the power supply and the pulse signal to the light emitting apparatus 60 connected to the connecting portion 49 by controlling the emitting device driving portion 48. When the light emitting apparatus 60 may not be used or is not used, the emission control portion 33 stops the output of the power supply and the pulse signal of the emitting device driving portion 48 under the control of the detection control portion 32. In addition, when using the light emitting apparatus 60, the emission control portion 33 outputs the power supply and the pulse signal of the emitting device driving portion 48.

The calibration control portion 39 detects the indication positions of the indicators 70 and 80, and executes a calibration for converting the indication positions into the coordinates in the input image of the image I/F portion 12. For example, the calibration is a process of associating the position in the image which is drawn in the frame memory 44 and projected by the projecting portion 20 and the position on the data of the captured image captured by the imaging portion 51. The indication positions of the indicators 70 and 80 detected by the position detection portion 50 from the data of the captured image are positions in the data of the captured image, and are indicated by, for example, the coordinates in the coordinate system set in the captured image. The user is aware of the projection image projected on the screen SC, and performs indication with the indicators 70 and 80. Accordingly, the projector 10 is required to specify the indication position in the projection image on the screen SC. The coordinates of the positions detected with the data of captured image can be converted into the coordinates on the projection image data by the calibration. The data that performs the association is set to be the calibration data. The calibration data is data for associating the coordinates on the captured image data output by the imaging control portion 53 with the coordinates on the projection image. Specifically, the calibration data may be a table in which the coordinates on the data of the captured image and the coordinates on the projection image are associated one by one, and may be a function for converting the coordinates on the data of the captured image into the coordinates on the projection image.

The calibration control portion 39 may execute the calibration corresponding to the kinds of the indicators. That is, the calibration control portion 39 executes two kinds of calibrations: a calibration relating to the detection of the indication position of the indicator 70 and a calibration relating to the detection of the indication position of the indicator 80. Particularly, according to the present embodiment, a calibration relating to the indication position of the indicator 70 is described.

The calibration control portion 39 can execute the auto calibration and the manual calibration as calibrations relating to the indication position of the indicator 70.

The auto calibration is a process of projecting an image for the auto calibration on the screen SC, capturing the screen SC with the imaging portion 51, and generating calibration data by using the data of the captured image. The auto calibration can be automatically executed by the projector 10, and does not require the operation of the indicator 70 by the user. The auto calibration is not limited to a case in which the user instructs the execution with the remote controller or the operation panel 19, and may be executed at the timing controlled by the control portion 30. For example, the auto calibration may be performed at the time of starting an operation right after the electric power of the projector 10 is turned on, or may be performed during the normal operation described below. The auto calibration image 121 projected by the auto calibration is stored in the storage portion 110 in advance.

Figure 3:
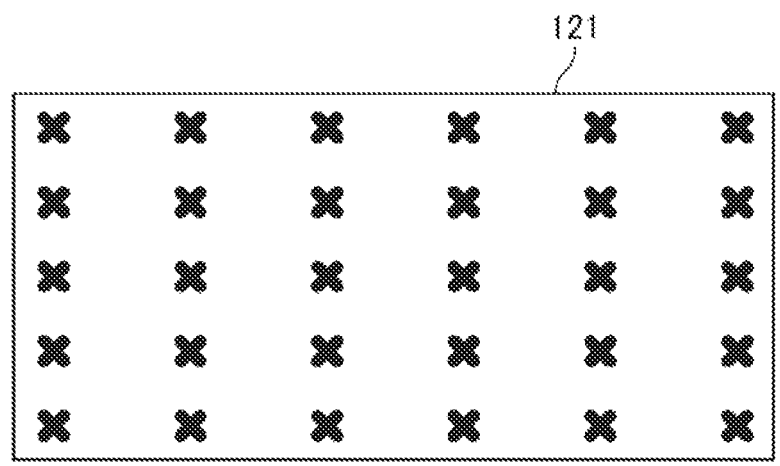
FIG. 3 is a diagram illustrating an example of an auto calibration image.

FIG. 3 is an example of the auto calibration image 121 (image for calibration). A plurality of marks (symbols) are arranged in the auto calibration image 121 at a predetermined interval. The mark in the calibration image is a diagram or a symbol that can be detected from the data of the captured image, and the shape or the size is not particularly limited.

Figure 4:
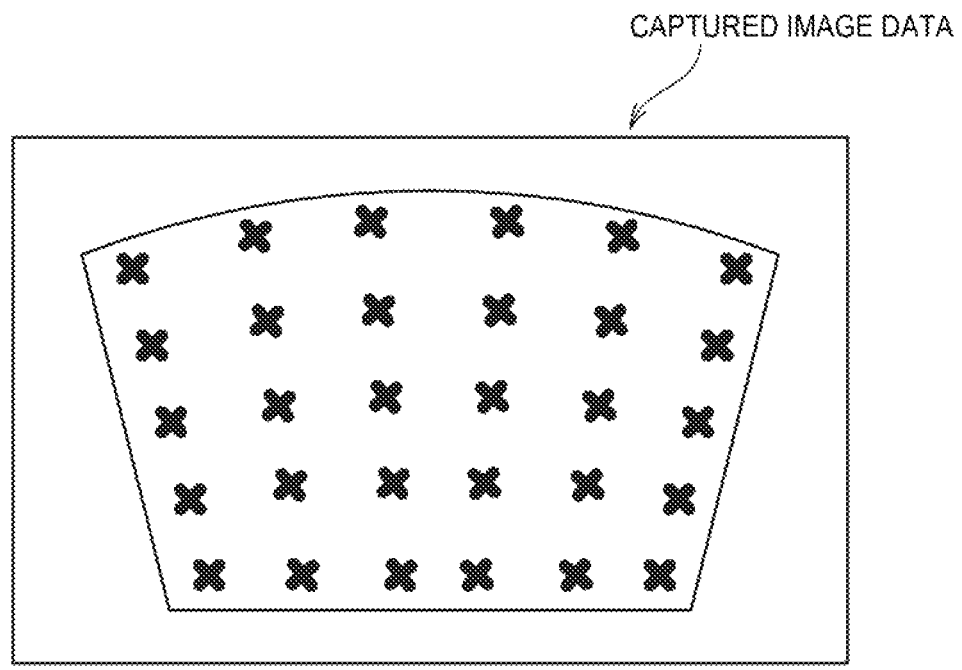
FIG. 4 is a diagram illustrating an example of the captured image data obtained by capturing the auto calibration image projected on the screen.

FIG. 4 is a diagram illustrating an example of the data of the captured image obtained by capturing the auto calibration image 121 projected on the screen SC by the imaging portion 51. When the projector 10 is installed in a suspending manner as illustrated in FIG. 1, the data of the captured image of the imaging portion 51 is captured from the obliquely upper side of the screen SC, so the image becomes distorted. FIG. 3 illustrates an example of the rectangular auto calibration image 121 in which marks are lined up at even intervals, but an image having a distorted shape is taken in the data of the captured image of FIG. 4, and the intervals of the lined-up marks inside the image are different according to the positions of the marks.

The calibration control portion 39 operates the image processing portion 40 and the projecting portion 20 based on the auto calibration image 121 stored in the storage portion 110 by the function of the projection control portion 31, and projects the auto calibration image 121 on the screen SC. The calibration control portion 39 obtains the data of the captured image by controlling the position detection portion 50 and causing the imaging portion 51 to capture an image. The data of captured image is temporarily stored in a memory (not illustrated) from the imaging control portion 53, and is output to the control portion 30. The calibration control portion 39 detects the mark from the data of the captured image, and acquires the barycentric positions of the respective marks as coordinate values of the marks. The calibration control portion 39 associates the mark detected from the data of the captured image with the projection image drawn in the frame memory 44, that is, the mark of the auto calibration image 121.

The calibration control portion 39 creates the auto calibration data 123 in the table format or the function format by associating the coordinate values of the marks in the captured image and the coordinate values of the marks in the projection image. The coordinate values of the marks of the auto calibration image 121 in the projection image are stored in advance in the storage portion 110 together with the auto calibration image 121, or are included in the auto calibration image 121 to be stored in the storage portion 110 in advance. When the auto calibration data 123 is already stored, the calibration control portion 39 updates the auto calibration data 123. The calibration control portion 39 associates one mark of the auto calibration image 121 with one coordinate. Accordingly, when the auto calibration image 121 including a plurality of marks is used, the association can be performed with respect to the plurality of coordinates in the projection area of the screen SC.

In the auto calibration, the imaging portion 51 receives visible light and performs capturing. Therefore, the captured image output by the imaging control portion 53 may be color image data, or may be monochrome image data. According to the present embodiment, the calibration control portion 39 processes monochromic binary image data, or grayscale image data that has brightness information and does not include color information, as the data of the captured image of the imaging portion 51. Here, the imaging control portion 53 may output monochromic binary or grayscale image data under the control of the calibration control portion 39. Otherwise, under the control of the calibration control portion 39, the indicator detecting portion 54 may convert the output image data of the imaging control portion 53 into monochromic binary image data or grayscale image data, and then detects the marks.

The manual calibration is a process of projecting an image for the manual calibration on the screen SC, detecting the operation of the indicator 70 corresponding to the projected image, and generating the manual calibration data.

Figure 5:
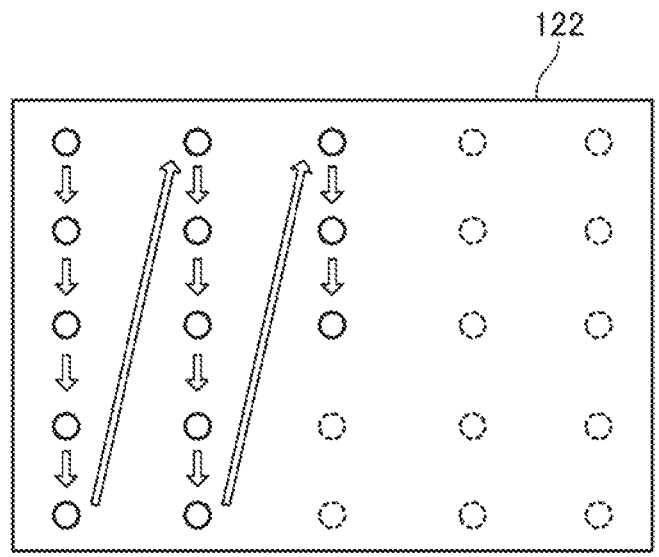
FIG. 5 is a diagram illustrating an example of a manual calibration image.

FIG. 5 is a diagram illustrating an example of the manual calibration image 122. The manual calibration image 122 includes a mark showing the indication position in order to cause the user to perform indication with the indicator 70. In the manual calibration image 122 of FIG. 7, a plurality of indication marks (the mark o) are arranged, and the user indicates the positions of the marks with the indicator 70.

The plurality of marks are included in the manual calibration image 122, but the marks are projected on the screen SC one by one. Therefore, the manual calibration image 122 is specifically formed with the combination of the plurality of images having the different number of marks.

Every time when marks are displayed on the screen SC, the user indicates a newly displayed mark with the indicator 70. The calibration control portion 39 detects the indication position every time when the user performs the operation. Then, the calibration control portion 39 associates the indication positions detected in the captured image and the projection images drawn in the frame memory 44, that is, the marks of the manual calibration image 122. The calibration control portion 33 creates the manual calibration data 124 by associating the coordinate values of the indication positions detected with the data of the captured image and the coordinate values of the marks on the projection image.

The manual calibration data 124 may be formed in the same format with the auto calibration data 123, but can be set to be the correction data for correcting the auto calibration data 123. The auto calibration data 123 is data for converting the coordinates on the captured image into the coordinates on the projection image. In contrary, the manual calibration data 124 is the data for further correcting the coordinates after the conversion by using the auto calibration data 123.

When the calibration relating to the detection of the indication positions of the indicator 70 is performed, the calibration control portion 39 can execute the auto calibration or the manual calibration. When the storage portion 110 stores the auto calibration data 123 generated in the past, the auto calibration and the manual calibration can be selectively executed. Here, when the auto calibration is executed, the calibration control portion 39 updates the auto calibration data 123 of the storage portion 110. In addition, when the manual calibration is executed, the manual calibration data 124 is generated or updated. In addition, when the auto calibration data 123 is not stored in the storage portion 110, it is required to execute the auto calibration. It is because the manual calibration data 124 may not be used when the auto calibration data 123 is not stored.

The calibration control portion 39 can execute the calibration relating to the detection of the indication position of the indicator 80 in the same manner as the manual calibration of the indicator 70. In this case, the calibration control portion 39 generates the manual correction data 126. The manual correction data 126 is used when the indication position of the indicator 80 is detected.

Figure 6:
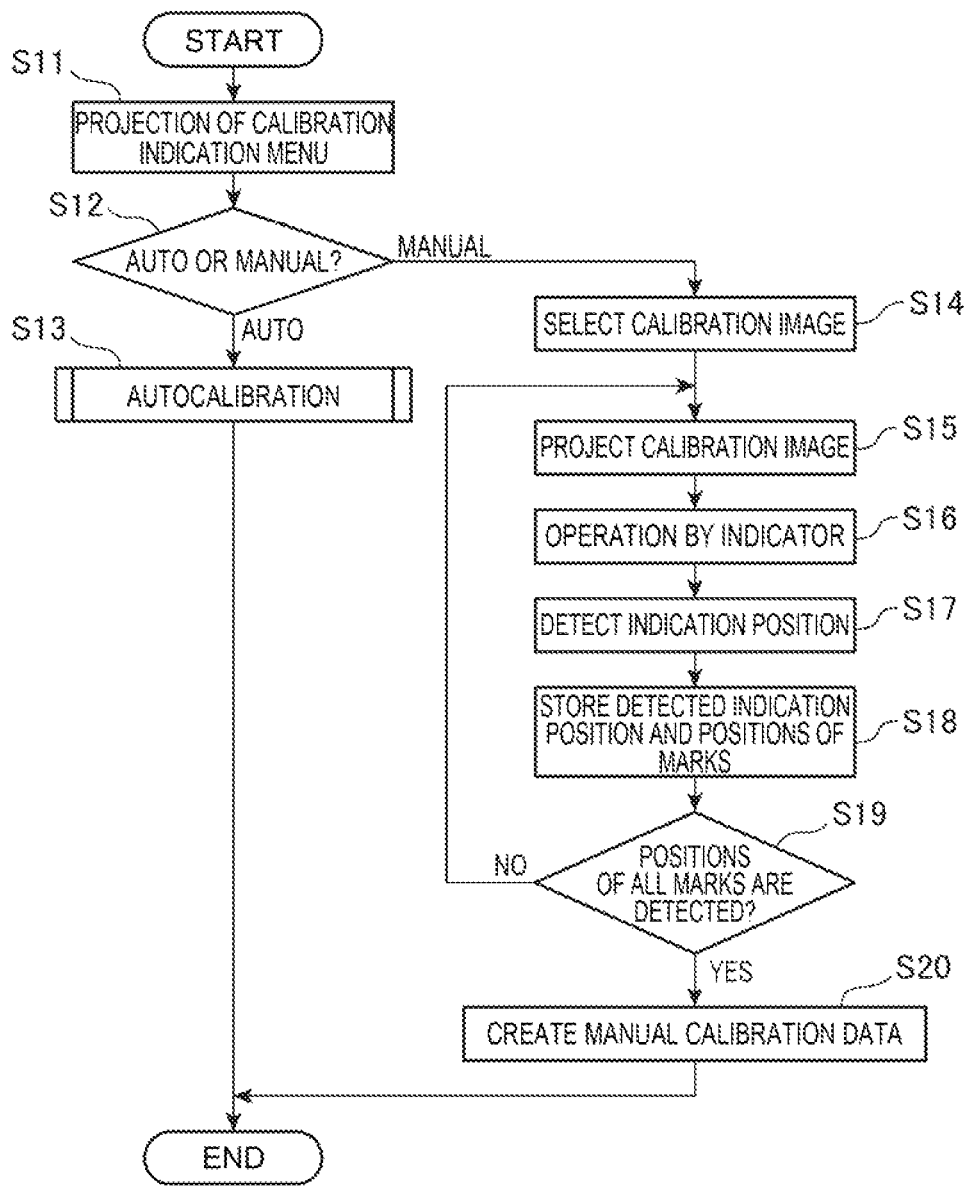
FIG. 6 is a flow chart illustrating an operation of a projector.

FIG. 6 is a flow chart illustrating an operation of the projector 10 relating to the calibration.

The calibration control portion 39 causes the projecting portion 20 to project a menu screen for selecting whether to execute the auto calibration or to execute the manual calibration (Step S11). The calibration control portion 39 detects an operation of the remote controller or the operation panel 19 (Step S12), proceeds to Step S13 when the auto calibration is selected, and proceeds to Step S14 when the manual calibration is selected.

Figure 7:
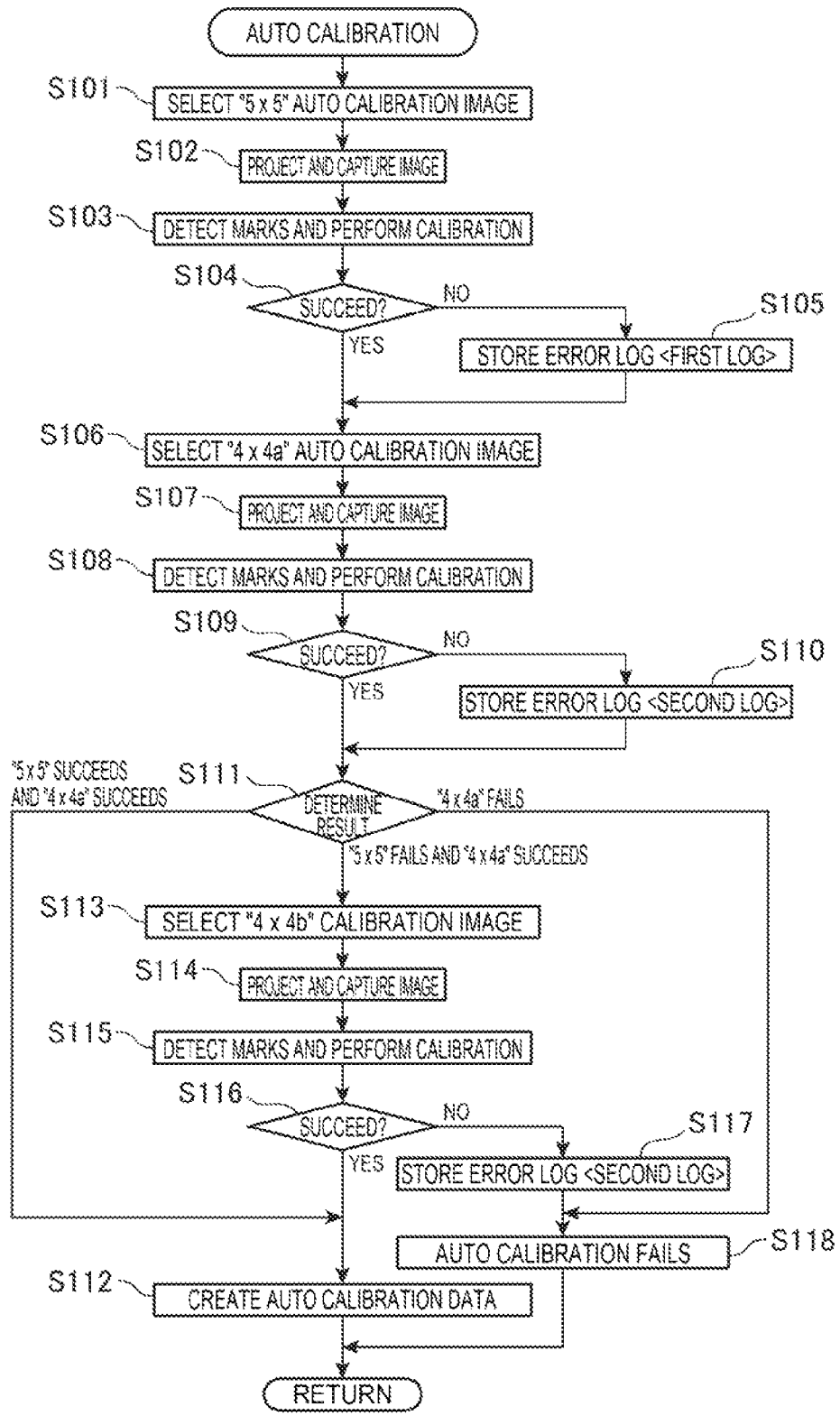
FIG. 7 is a flow chart illustrating an operation of a projector.
Figure 8A:
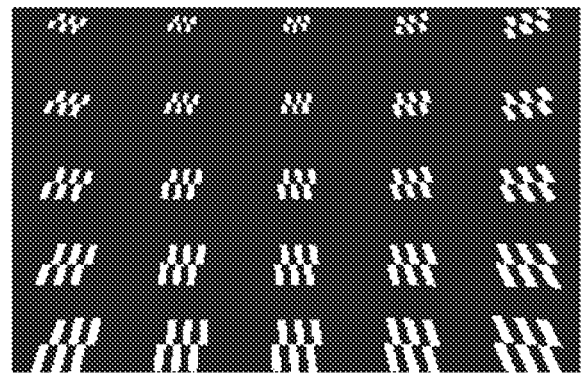
FIGS. 8A and 8B are diagrams illustrating an example of an auto calibration image.
Figure 8B:
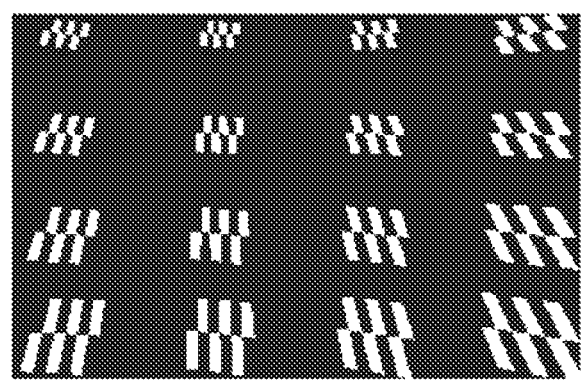

FIG. 7 is a flow chart illustrating details of the operation of the auto calibration in Step S13. In addition, FIGS. 8A and 8B are diagrams illustrating an example of the auto calibration image projected in the auto calibration. FIG. 8A is an example of a 5×5 auto calibration image, and FIG. 8B is an example of a 4×4 auto calibration image.

If the auto calibration is selected, the calibration control portion 39 executes the auto calibration by using the plurality of auto calibration images 121.

First, the calibration control portion 39 selects the first auto calibration image 121 (Step S101). According to the present embodiment, the "5×5" auto calibration image 121 is selected. The auto calibration image 121 is an image in which marks in 5 rows and 5 columns are arranged as illustrated in FIG. 8A. The marks arranged in the auto calibration image 121 are checkered patterns which are displayed in white on a black background. The marks in the auto calibration image 121 are preferably configured with a plurality of dots (pixels). In this case, the coordinates of the centroids of the plurality of dots that configure respective marks are processed as the coordinates of the respective marks.

The calibration control portion 39 causes the imaging portion 51 to capture the "5×5" auto calibration image 121 in a state of being projected on the screen SC by the projecting portion 20 (Step S102). The calibration control portion 39 causes the position detection portion 50 to detect the marks the data from the captured image, and to execute the calibration by calculating the coordinates of the marks (Step S103).

Here, the calibration control portion 39 determines whether the processes of Step S103 succeed (Step S104). That is, the calibration control portion 39 determines whether the process of detecting the marks from the data of the captured image, the process of associating the detected marks with the marks in the projection image, and the process of associating the coordinates of the marks in the data of the captured image with the coordinates of the marks in the projection image succeed. For example, it is determined that the processes do not succeed (fails) when the number of detected marks or associated marks is less than a set threshold value.

If it is determined that the calibration using the "5×5" auto calibration image 121 fails (Step S103; No), the calibration control portion 39 stores an error log as a first log, in the storage portion 110 (Step S105), and proceeds to Step S106. In addition, if it is determined that the calibration succeeds (Step S104; Yes), the calibration control portion 39 proceeds to Step S106.

In Step S106, the calibration control, portion 39 starts a second calibration. That is, the calibration control portion 39 selects the second auto calibration image 121. According to the present embodiment, the "4×4a" auto calibration image 121 is selected. The auto calibration image 121 is an image in which marks in 4 rows and 4 columns are arranged as illustrated in FIG. 8B, and an image of which the arrangement state (size, shape, position, or the like) of the marks is "5×5" is a different auto calibration image 121. In addition, the respective 16 marks included in the "4×4a" auto calibration image 121 are arranged at positions different from the 25 marks included in the "5×5" auto calibration image 121. That is, the respective marks correspond to different coordinates. In addition, the projector 10 stores the plurality of auto calibration images 121 in which 4 rows and 4 columns are arranged, and "4×4a" indicates a first auto calibration, image 121 (*a*) among the auto calibration images 121.

The calibration control portion 39 causes the imaging portion 51 to capture the "4×4a" auto calibration image 121 in a state of being projected on the screen SC by the projecting portion 20 (Step S107). The calibration control portion 39 causes the position detection portion 50 to detect the marks from the data of the captured image, and executes the calibration by calculating the coordinates of the marks (Step S108).

Here, the calibration control portion 39 determines whether the processes in Step S103 succeed (Step S109). In the same manner as in Step S104, it is determined whether a process of detecting the marks from the data of the captured image, a process of associating the detected marks with the marks in the projection image, and a process of associating the coordinates of the marks in the data of the captured image with the coordinates of the marks in the projection image succeed. For example, it is determined that the processes do not succeed (fails) when the number of detected marks or associated marks is less than a set threshold value.

If it is determined that the calibration using the "4×4a" auto calibration image 121 fails (Step S109; No), the calibration control portion 39 stores an error log as a second log, in the storage portion 110 (Step S110), and proceeds to Step S111. In addition, if it is determined that the calibration succeeds (Step S109; Yes), the calibration control portion 39 proceeds to Step S111.

In Step S111, the results of the first and second calibrations are determined.

When both of the first and second, calibrations succeed, that is, both of Steps S104 and S109 succeed, the calibration control portion 39 generates the auto calibration data 123 (Step S112), and ends the present process.

In addition, when the first calibration fails and the second calibration succeeds, the calibration is performed again. Since the "5×5" auto calibration image ill is used in the first calibration, and the "4×4a" auto calibration image 121 is used in the second calibration, the calibration fails in the auto calibration image 121 which have many marks and small marks. In other words, the calibration succeeds in the auto calibration image 121, in which, the number of marks is small. Here, the calibration control portion 39 selects the "4×4b" auto calibration image 121 including the same number of marks as in the second calibration (Step S113). "4×4b" refers to the auto calibration image 121 in which 4 rows and 4 columns of marks are included in the same manner as "4×4a" but the arrangement state (size, shape, position, and the like) of the marks is different from "4×4a". In addition, the respective 16 marks included in the "4×4b" auto calibration image 121 are arranged at positions different from the 16 marks included in the "4×4a" auto calibration image 121. That is, the respective marks are associated with different coordinates.

The calibration control portion 39 causes the imaging portion 51 to execute capturing the "4×4b" auto calibration image 121 in a state of being projected on the screen SC by the projecting portion 20 (Step S114). The calibration control portion 39 causes the position detection portion 50 to defect marks from the data of the captured image and executes the calibration by calculating the coordinates of the marks (Step S115).

Here, the calibration control portion 39 determines whether the processes in Step S115 succeed (Step S116). In the same manner as Steps S104 and S109, it is determined whether a process of detecting the marks from the data of the captured image, a process of associating the detected marks with the marks in the projection image, and a process of associating the coordinates of the marks in the data of the captured image with the coordinates of the marks in the projection image succeed.

If it is determined that the calibration using the "4×4b" auto calibration image 121 fails (Step S116; No), the calibration control portion 39 overwrites an error log as a second log (Step S117). Here, the calibration control portion 39 overwrites and updates the second log stored in the storage portion 110 in Step S110 as the error log. The calibration control portion 39 determines that the auto calibration fails (Step S118), and ends the present process, for example, by reporting the failure of the auto calibration by a projection image or the like.

In addition, if it is determined that the calibration in Step S116 succeeds (Step S116; Yes), the calibration control portion 39 proceeds to Step S112, and generates the auto calibration data 123.

In addition, in Step S111, when both of the first and second calibrations fail, the calibration control portion 39 proceeds to Step S118, determines that the auto calibration fails, and ends the present process.

In this manner, with respect to the auto calibration, the calibration control portion 39 executes the calibration by using at least a plurality of auto calibration images 121. Then, in Step S112, the auto calibration data 123 in which a plurality of calibrations using the auto calibration images 121 are reflected is generated. For example, the auto calibration data 123 generated in the first calibration may be corrected according to the result of the second calibration. In addition, the auto calibration data 123 may be generated by calculating an average value with respect to the associated coordinates obtained in the plurality of times of calibrations.

In addition, the calibration control portion 39 executes calibration by firstly selecting the auto calibration image 121 having many marks and secondly selecting the auto calibration image 121 having fewer marks. In this case, since the calibration performed later is easy to succeed, when the calibration fails, the auto calibration image 121 having fewer marks may be used. In this manner, the process can be effectively executed by firstly selecting the auto calibration image 121 which is difficult to succeed.

Further, in the example of FIGS. 8A and 8B, a configuration in which the plurality of auto calibration images 121 have different numbers of marks is described, but, for example, the plurality of auto calibration images 121 having different sizes of marks may be used. In addition, the auto calibration images 121 in which the shape of the mark, the position of the mark, the arrangement of the marks, the gap between marks, and the number of pixels configuring the marks are different may be used. In addition, the designs and the symbols of the marks in the auto calibration image 121 and the manual calibration image 122 are not limited to those illustrated in FIGS. 3 to 5, and FIGS. 8A and 8B. The marks may be diagrams that can be extracted from the data of the captured image, and are configured in the plurality of pixels.

As described above, the auto calibration images 121 in which the numbers of marks are different are stored in the storage portion 110, but the auto calibration images 121 may be stored in association with the projection resolution or the aspect ratio of the projecting portion 20. In this case, the calibration control portion 39 may select the auto calibration image 121 based on the number of marks or the like, from the auto calibration image 121 stored in association with the resolution and the aspect ratio of the projection image.

Meanwhile, when the manual calibration is selected, the calibration control portion 39 selects the manual calibration images 122 in Step S14 of FIG. 6. The calibration control portion 39 causes the projecting portion 20 to project the selected manual calibration image 122 to the screen SC (Step S15). When the manual calibration image 122 is projected on the screen SC, the user may adjust the display size, the display shape and the display position so that the manual calibration image 122 is settled in the display area of the screen SC by the operation of the remote controller or the operation panel 19, before proceeding to Step S16.

Here, an operation of using the indicator 70 is performed by the user (Step S16).

The calibration control portion 39 causes the imaging portion 51 to capture the captured image in which the indicator 70 points the marks in synchronization with the light emission timing of the indicator 70. The calibration control portion 39 detects the indication positions of the indicator 70 by obtaining the data of the captured image (Step S17).

The calibration control portion 39 causes the storage portion 110 to store indication coordinates on the data of the captured image detected by the position detection portion 50 and the coordinates on the projection image of the corresponding marks (Step S18).

The calibration control portion 39 determines whether the indication positions are detected with respect to all the marks in the manual calibration image 122 (Step S19), if there is an unprocessed mark (Step S19; No), the calibration control portion 39 returns to Step S15.

In addition, when the indication positions of all the marks are detected (Step S19; Yes), the calibration control portion 39 creates the manual calibration data 124 based on the coordinates of the indication positions and the positions of the marks which are temporarily stored in Step S18 (Step S20). Here, the created manual calibration data 124 is stored in the storage portion 110.

Further, the calibration control portion 39 may generate the manual calibration data 124 including data in the same manner as the auto calibration data 123 by the manual calibration of the indicator 70. In this case, the calibration control portion 39 generates the manual calibration data 124 which are the same as the auto calibration data 128 by the processes in Steps S14 to S20 of FIG. 3. In addition, the auto calibration data 123 and the manual calibration data 124 may be set to be the same data. In this case, the auto calibration data 123 generated before is overwritten by the data in Step S20.

In this configuration, if the calibration control portion 39 executes any one of the auto calibration or the manual calibration, it is possible to obtain the coordinates of the indication position of the indicator 70. Accordingly, in the operation of FIG. 6, when the auto calibration data 123 is not stored, it is possible to select the manual calibration in Step S12.

As described above, the projector 10 according to the present embodiment to which the invention is applied includes the projecting portion 20, the position detection portion 50, and the control portion 30. The projecting portion 20 projects the image on the screen SC. The position detection portion 50 detects the operation on the screen SC based on the captured image obtained by capturing the screen SC. The control portion 30 causes the calibration control portion 39 to execute the calibration in which positions in the projection image and positions in the imaging image are associated with each other based on the captured image obtained by capturing the projection image based on the auto calibration image 121 in which the marks for specifying positions are arranged. In addition, the calibration control portion 39 executes the calibrations based on the captured images corresponding to the plurality of auto calibration images 121 in which the arrangement states of the marks are different. Accordingly, the calibration control portion 39 executes the calibration by using the plurality of auto calibration images 121 in which the arrangement states of the marks are different. Therefore, even though the marks of the auto calibration image 121 are not fine, it is possible to associate the positions in the captured image and the positions in the projection image with each other at a plurality of positions, and to highly accurately perform the association of the positions. In addition, since the marks of the auto calibration image 121 do not have to be fine, it is possible to securely and easily detect the marks. Accordingly, it is possible to effectively and highly accurately perform the calibration.

In addition, the calibration control portion 39 generates the auto calibration data 123 in which the positions in the projection image and the positions in the captured image are associated with each other. Since the calibration data in which the positions in the projection image and the positions in the captured image are finely associated is generated, it is possible to highly accurately detect positions by using the calibration data.

In addition, the calibration control portion 39 generates one of the calibration data based on the captured images corresponding to the plurality of auto calibration images 121. It is possible to generate the calibration data in which the positions in the projection image and the positions in the captured image are more finely associated than in the case of using a single auto calibration image 121.

In addition, the calibration control portion 39 generates the calibration data in which the marks arranged in the plurality of auto calibration images 121 are respectively associated with different coordinates. Therefore, it is possible to associate a greater number of coordinates than the number of marks in one auto calibration image 121 by using the plurality of auto calibration images 121. Accordingly, it is possible to associate positions in multiple coordinates with respect to the auto calibration data 123. Therefore, it is possible to generate highly precise calibration data without being restricted by the number of marks in the auto calibration image 121.

In addition, the calibration control portion 39 generates calibration data based on the binary or grayscale captured image. Since the data amount of the captured image can be suppressed and the computational load of the process for detecting the marks from the captured image is light, the calibration can be effectively executed. In addition, even if the number of marks in the auto calibration image 121 decreases so that marks in the binary or grayscale captured image can be easily detected, the highly precise calibration data can be generated.

In addition, the calibration control portion 39 generates the calibration data based on the captured image captured with visible light. An image with visible light based on the auto calibration image 121 is projected, and the calibration is performed based on the captured image obtained by capturing the projection image with visible light. Therefore, the state of the automatically executed calibration can be recognized by the user.

In addition, the auto calibration image 121 is an image in which marks configured with at least a plurality of pixels are arranged. Since the marks arranged in the auto calibration image 121 have dimensions, the marks can be easily detected from the captured image. In addition, more information can be obtained in the process in which the captured image and the projection image are associated from the deformation, of the shapes of the marks, or the like. Additionally, for example, the calibration can be highly accurately performed by extracting the images of the marks from the captured image and setting the centroids of the marks to be detection, coordinates.

Further, the embodiments and the modifications described above are merely specific examples to which the invention is applied, and the specific embodiments disclosed are not intended to limit the invention, and the invention may be applied according to another aspect. According to the embodiments described above, a case in which the invention is applied to the auto calibration in which the indication position of the indicator 70 is detected is described, but it is possible to apply the invention by performing an auto calibration as the calibration in which the indication position of the indicator 80 is detected. According to the embodiments above, for example, the indicator is not limited to the pen-type indicator 70 or the indicator 80 which is the finger of the user, and a laser pointer, an indication rod, or the like may be used, and the shape and the size thereof are not limited. In addition, a method of detecting the indication position of the indicator is not limited to the example according to the present embodiment, and light such as visible light or ultraviolet rays may be used, and ultrasonic waves or radio waves may also be used.

In addition, according to the embodiments described above, with respect to the indicator 70 from the projector 10, a configuration of transmitting a signal for the synchronization to the indicator 70 by using the infrared signal generated by the transmitting portion 52 is described, but the signal for the synchronization is not limited to the infrared signal. For example, the signal for the synchronization may be transmitted by radio wave communication or ultrasonic radio wave wireless communication. The configuration may be realized by providing a transmitting portion for transmitting a signal by radio wave communication or ultrasonic radio wave wireless communication to the projector 10, and a receiving portion for receiving a signal in the same manner to the indicator 70.

In addition, according to the present embodiment, the position detection portion 50 specifies the position of the indicator 70 by capturing the screen SC by the imaging portion 51, but the invention is not limited to this. For example, the imaging portion 51 is not limited to be provided on the main body of the projector 10 and to capture the projection direction of the projection optical system 23. The imaging portion 51 may be arranged as a separate body from the main body of the projector 10, and the imaging portion 51 may perform capturing from the side direction of the screen SC or in front of the screen SC. Additionally, the plurality of imaging portions 51 are arranged, and the detection control portion 32 may detect the positions of the indicators 70 and 80 based on the data of the captured image of the plurality of imaging portions 51.

In addition, according to the embodiment described above a configuration of using three transparent liquid crystal panels corresponding to the respective colors of RGB is described as the optical modulating device 22 for modulating the light generated by the light source, but the invention is not limited to this. For example, three reflective liquid crystal panels may be used, or a method of combining one liquid crystal panel and a color foil may be used. Otherwise, a method of using three sheets of digital mirror devices (DMD), or a DM) method of combining one digital mirror device and a color foil may be used. When a liquid crystal panel of one sheet only or DMD is used as the optical modulating device, a member corresponding to the synthesis optical system such as the cross dichroic prism is not required. Further, in addition to the liquid crystal panel and the DMD, if a device is an optical modulating device that can modulate the light generated by the light source, the device can be employed without a problem.

In addition, according to the embodiment, it is described that the user performs the indication operation by the indicators 70 and 80 with respect to the screen SC to which the front projection-type projector 10 projects (displays) an image, but the user may perform the indication operation to a display screen (display surface) on which a display apparatus (display portion) other than the projector 10 displays an image. In this case, the light emitting apparatus 60 or the imaging portion 51 may be configured to be integrated with the display apparatus, or may be configured to be a separate body from the display apparatus. As the display apparatus other than the projector 10, a rear projection (rear surface projection)-type projector, a liquid crystal display, an organic Electro Luminescence (EL) display, a plasma display, a cathode-ray tube (CRT) display, a Surface-conduction Electron-emitter Display (SED) or the like can be used.

In addition, respective functional portions of the projection system 1 illustrated in FIG. 2 indicates functional configurations, and the specific installation state is not particularly limited. That is, it is not necessary to install hardware corresponding to the respective functional portions, and it is obvious that one processor can realize the functions of the plurality of functional portions by executing programs. In addition, a portion of the function realized by software in the present embodiment may be realized by hardware, or a portion of the function realized by the hardware may be realized by software. In addition, the specific detailed configuration of the respective portions in addition to the projection system 1 can be voluntarily changed without departing from the scope of the invention.

What is claimed is:

1. A projector comprising:
   a projecting portion that projects an image on a projection surface;
   a detection portion that detects the projected image on the projection surface based on a captured image obtained by capturing the image projected on the projection surface; and
   a calibration control portion that executes a calibration by:
      making the projecting portion project a first calibration image having a first plurality of symbols arranged in a first plurality of positions;
      making the detection portion capture a projected first calibration image;
      performing a first coordinate calculation that associates first symbol positions in a captured first calibration image with the first plurality of positions by calculating the coordinate positions of the first symbol positions;
      determining whether the first coordinate calculation succeeds;
      making the projecting portion project a second calibration image having a second plurality of symbols arranged in a second plurality of positions;
      making the detection portion capture a projected second calibration image;
      performing a second coordinate calculation that associates second symbol positions in a captured second calibration image with the second plurality of positions by calculating the coordinate positions of the second symbol positions;
      determining whether the second coordinate calculation succeeds;
      if the first coordinate calculation fails and the second coordinate calculation succeeds,
         projecting a third calibration image with the projecting portion,
         capturing the projected third calibration image with the detection portion, performing a third coordinate calculation that associates third symbol positions of a third plurality of symbols in a captured third calibration image with a third plurality of positions of the third plurality of symbols, by calculating the coordinate positions of the third symbol positions, and generating calibration data using the results of both the second and third coordinate calculations, and if the first coordinate calculation succeeds and the second coordinate calculation fails, the calibration data is not generated.

2. The projector according to claim 1, wherein one of the first and second plurality of symbols includes a plurality of pixels.

3. The projector according to claim 1, wherein the calibration control portion generates calibration data in which the first and second plurality of positions are associated with the first and second symbol positions, respectively.

4. The projector according to claim 3, wherein the first plurality of positions has different coordinates than the second plurality of positions.

5. The projector according to claim 3, wherein the captured first and second calibration images are binary or grayscale.

6. The projector according to claim 3, wherein the captured first and second calibration images are captured with visible light.

7. A display apparatus comprising:
a display portion that displays an image on a display surface;
a detection portion that detects the projected image on the display surface based on a captured image obtained by capturing the image projected on the display surface; and
a calibration control portion that executes a calibration by:
  making the projecting portion project a first calibration image having a first plurality of symbols arranged in a first plurality of positions;
  making the detection portion capture a projected first calibration image;
  performing a first coordinate calculation that associates symbol positions in a captured first calibration image with the first plurality of positions by calculating the coordinate positions of the first symbol positions;
  determining whether the first coordinate calculation succeeds;
  making the projecting portion project a second calibration image having a second plurality of symbols arranged in a second plurality of positions;
  making the detection portion capture a projected second calibration image;
  performing a second coordinate calculation that associates symbol positions in a captured second calibration image with the second plurality of positions by calculating the coordinate positions of the second symbol positions;
  determining whether the second coordinate calculation succeeds;
  if the first coordinate calculation fails and the second coordinate calculation succeeds,
    projecting a third calibration image with the projecting portion,
    capturing the projected third calibration image with the detection portion,
    performing a third coordinate calculation that associates third symbol positions of a third plurality of symbols in a captured third calibration image with a third plurality of positions of the third plurality of symbols, by calculating the coordinate positions of the third symbol positions, and
    generating calibration data using the results of both the second and third coordinate calculations, and
  if the first coordinate calculation succeeds and the second coordinate calculation fails, the calibration is not performed.

8. A control method of a projector including a projecting portion that projects an image on a projection surface, comprising:
detecting the projected image on the projection surface based on a captured image obtained by capturing the image projected on the projection surface;
executing a calibration including:
  making the projecting portion project a first calibration image having a first plurality of symbols arranged in a first plurality of positions;
  capturing a projected first calibration image;
  performing a first coordinate calculation that associates symbol positions in a captured first calibration image with the first plurality of positions by calculating the coordinate positions of the first symbol positions;
  determining whether the first coordinate calculation succeeds;
  making the projecting portion project a second calibration image having a second plurality of symbols arranged in a second plurality of positions;
  capturing a projected second calibration image;
  performing a second coordinate calculation that associates symbol positions in a captured second calibration image with the second plurality of positions by calculating the coordinate positions of the second symbol positions;
  determining whether the second coordinate calculation succeeds;
  if the first coordinate calculation fails and the second coordinate calculation succeeds,
    projecting a third calibration image with the projecting portion,
    capturing the projected third calibration image with the detection portion,
    performing a third coordinate calculation that associates third symbol positions of a third plurality of symbols in a captured third calibration image with a third plurality of positions of the third plurality of symbols, by calculating the coordinate positions of the third symbol positions, and
    generating calibration data using the results of both the second and third coordinate calculations, and
  if the first coordinate calculation succeeds and the second coordinate calculation fails, the calibration is not performed,
wherein most of the first plurality of positions and most of the second plurality of positions are different from each other.

* * * * *